United States Patent
Phani et al.

(10) Patent No.: US 6,548,586 B1
(45) Date of Patent: Apr. 15, 2003

(54) COMPOSITION USEFUL FOR MAKING IN-SITU SILICON CARBIDE WHISKERS AND FIBRES

(75) Inventors: Kalyan Kumar Phani, Calcutta (IN); Asok Kumar De, Calcutta (IN); Nripati Ranjan Bose, Calcutta (IN); Sankar Ghatak, Calcutta (IN)

(73) Assignee: Council of Scientific & Industrial Research, New Delhi (IN)

( * ) Notice: Subject to any disclaimer, the term of this patent is extended or adjusted under 35 U.S.C. 154(b) by 86 days.

(21) Appl. No.: 09/781,199

(22) Filed: Feb. 22, 2001

(51) Int. Cl.[7] .................................................. C08K 3/34
(52) U.S. Cl. ....................... 524/442; 423/324; 423/345; 501/88
(58) Field of Search .......................... 524/442; 423/324, 423/345; 501/88

(56) References Cited

U.S. PATENT DOCUMENTS

| 5,037,626 A | * | 8/1991 | Ho et al. .................... 423/345 |
| 5,096,858 A | * | 3/1992 | Das Chaklader et al. ..... 501/89 |
| 5,298,467 A | * | 3/1994 | Hurtado et al. ............... 501/90 |
| 5,455,212 A | * | 10/1995 | Das Chaklader et al. ..... 501/89 |
| 5,654,094 A | * | 8/1997 | Patel et al. .................. 428/367 |
| 6,398,991 B1 | * | 6/2002 | Brazil et al. ................ 264/29.1 |

* cited by examiner

*Primary Examiner*—Edward J. Cain
*Assistant Examiner*—Katarzyna W. Lee
(74) *Attorney, Agent, or Firm*—Schweitzer Cornman Gross & Bondell LLP

(57) ABSTRACT

A composition useful for making in-situ silicon carbide whiskers and fibers in an inorganic composite matrix selected from silicon carbide carbon and carbon composite matrix, wherein the said composition comprises: Natural Fiber (1.6–6.5 Wt %); TetraEthyl Orthosilicate (10.4–42 Wt %); Phenolic Resin (38–73.5 Wt %); Curing agent (4.2–11 Wt %); Optionally, Silicon Carbide (9.4–12 Wt %); Organic Solvent (requisite amount to dissolve the Phenolic resin). The fiber preferably is a natural fiber selected from the group consisting of jute, sisal, hem and other natural fiber having cellulosic or hemicellulosic constituent at its backbone. The curing agent preferably is selected from hexamine, para toluenesulphonic acid and para formaldehyde, most preferably hexamine. The molecular weight of phenolic resin preferably is in the range of 450–700, and the organic solvent preferably is selected from methanol, toluene and benzene.

7 Claims, No Drawings

COMPOSITION USEFUL FOR MAKING IN-SITU SILICON CARBIDE WHISKERS AND FIBRES

FIELD OF THE INVENTION

The present invention relates to a composition useful for making in-situ Silicon Carbide in the form of particulate, whiskers and fibers in an inorganic composite matrix and a process thereof.

The process of the present invention particularly relates to the use of wide variety of natural fibers such as jute, hem, sisal or any other natural fibre having cellulosic or hemi-cellulosic fibre as its backbone as raw materials for providing useful carbon for the formation of silicon carbide in the form of particulate, whiskers and fibers in an inorganic composite matrix selected from Silicon Carbide-carbon and carbon matrix.

The main usage of the silicon carbide particulate, whiskers, fibre in Silicon Carbide-carbon or carbon composite matrix is in the field of engineering materials in any shape as may be deemed fit.

BACKGROUND OF THE INVENTION

The present day method of making Silicon Carbide particulate, whisker and fibre reinforced composite in Silicon Carbide-carbon matrix or carbon matrix essentially consists of seeding graphite substrate with metal droplets such as Fe, Co, Cr and Mn as catalyst for the whisker formation. Methane and silicon monoxide supply C and Si respectively—the references for which may be made to "Synthesis and Characterization of VLS—Derived SiC whiskers" of P. D. Shalek in Conf. Whisker and Fiber Toughened Ceramics, Oak Ridge TN (1988) and to "Review of VLS Sic Whisker Growth Technology" by W. E. Holler and J. J. Kim in Ceram. Engg. Sci. Proc., vol. 12, pp979–991 (1991) or making fibre by melt extrusion and suspension spinning of compositions of ultrafine SiC powders and organic additives such as polyvinyl butyral respectively followed by sintering or making fibre by melt spinning polymers which can be rapidly cured in the solid state and polymerised to ceramic fibers with compositions which are stoichiometric silicon carbide or which are carbon-rich or silicon—rich silicon carbide the reference for which may be made to "Silicon Carbide: from Acheson's Invention to New Industrial Products" by W. D. G. Boecker in cfi/Ber. DKG74 (5), 1997. The fibers and whiskers produced by the above processes are mixed mechanically with the matrix material and are fabricated into different sizes and shapes followed by heat treatment at different temperatures for consolidations the references for which may be made to "Pressureless Sintering of $Al_2O_3$/SiC Materials: Effect of the Reducing Atmosphere" by G. Urretavizcaya, J. M. Porto Lopez & A. L. Cavalieri, J. Eu. Ceram. soc. 17 1555–63 (1997). In a process inorganic polymers that are ceramic precursors are spun into fibers by melt-spinning or solvent—assisted dry spinning, stabilising the fibers to prevent remelting followed by thermally decomposing into fibers, the references for which may be made to German P.2,618150; French P.2,308, 590; Japanese P.51 130325, 51 139929, 51 147623 (1976). In slurry spinning a dispersion of crystalline ceramic particulate in a carrier fluid is formed into a fibre, converted to fibre by thermal conversion by several heating stages that may include passing the fibre through a flame. The process generate particulate of not more than 1 um to control shrinkage the references for which may be made to E. I. du Pont de Nemovrs and Co. B. P. 1,264,973 (1972); U.S. Pat. No. 3,808,015 (1974); U.S. Pat. No. 4,753,904 (1988), Mitsul Mihie Co. Ltd. Japanese P 217182 (1986); European P. 0,206,868-A2 (1988), U.S. Pat. No. 4,812,271 (1989).

The overall process has several drawbacks that may be listed below:
1. Number of steps involved in the overall process is higher.
2. Handling of whiskers and short fibers require special arrangements.
3. It is difficult to disperse whiskers and short fibers uniformly in the matrix.
4. Silicon Carbide whiskers particularly of aspect ratio less than 10 cause health hazard.

The main object of the present invention is to provide a composition useful for making in-situ silicon carbide in the form of particulate, whiskers and fibers inman inorganic composite matrix selected from Silicon Carbide-carbon and carbon matrix composite.

Another object of the present invention is to provide a process for making in-situ silicon carbide in the form of particulate, whiskers and fibers in an inorganic composite matrix selected from Silicon Carbide carbon and carbon matrix composite which obviates the drawbacks as detailed above.

Yet another object of the present invention is to utilise natural fibers of plant source.

Still another object of the present invention is to reduce the total number of unit processes in the overall operation.

Yet another object of the present invention is to form whiskers and fibers in situ during processing to eliminate totally the possibility of health hazard.

DETAILED DESCRIPTION OF THE INVENTION

Accordingly the present invention provide a composition useful for making in-situ silicon carbide in the form of particulate, whiskers and fibers in an inorganic composite matrix selected from silicon carbide carbon and carbon composite matrix, wherein the said composition comprising:

| | |
|---|---|
| Natural Fibre | 1.6–6.5 Wt % |
| TetraEthyl Orthosilicate | 10.4–42 Wt % |
| Phenolic Resin | 38–73.5 Wt % |
| Curing agent | 4.2–11 Wt % |
| Silicon Carbide (optional) | 9.4–12 Wt % |
| Organic Solvent | requisite amount to dissolve Phenolic resin |

In an embodiment of the present invention the inorganic composite matrix such as a silicon carbide-carbon composite matrix further comprising:

| | |
|---|---|
| Natural Fibre | 1.6–6.4 Wt % |
| TetraEthyl Orthosilicate | 10.4–42 Wt % |
| Phenolic Resin | 38–46 Wt % |
| Curing agent | 4.2–6.6 Wt % |
| Silicon Carbide | 9.4–12.4 Wt % |
| Organic Solvent | requisite amount of dissolve Phenolic resin |

In yet another embodiment the inorganic composite matrix such as a carbon composite matrix further comprising:

| | |
|---|---|
| Natural Fibre | 2.5–6.5 Wt % |
| TetraEthyl Orthosilicate | 13.4–40 Wt % |
| Phenolic Resin | 46–73.5 Wt % |
| Curing agent | 7.5–11 Wt % |
| Organic Solvent | requisite amount to dissolve Phenolic resin |

In yet another embodiment the fibre used is a natural fibre selected from the group consisting of jute, sisal, hem and any other natural fibre having cellulosic or hemicellulosic constituent at its backbone.

In yet another embodiment the curing agent used is selected from hexamine, para toluenesulphonic acid and para formaldehyde most preferably hexamine.

In yet another embodiment the molecular weight of phenolic Fresin used is in the range of 450–700.

In still another embodiment the organic solvent used is selected from methanol, toluene and benzene.

In an another embodiment of the present invention provides a process for making in-situ carbide in the form of particulate, whiskers and fibers in an inorganic composite matrix, which comprises, dissolving 38 to 73.5 Wt % of phenolic resin in an organic solvent to obtain a phenolic resing solution, adding 4.2–11.0 Wt % of a curing agent optionally adding 9.4–12 Wt % of silicon carbide powder to obtain a resin mix followed by impregnating 1.6–6.5 Wt % of natural fibre with the said resin mix dried at 60°–70° C. for a period in the range of 1–5 hrs. to obtain a dough in the form of a composite plate sheet, drying the said composite plate or sheet at a temperature in the range of 70°–90° C. for a time period in the range of 1–2 hrs., drying the composite plate or sheet, heat treating the dried composite plate or sheet at a temperature in the range of 150°–200° C. for a period in the range of 1–2.5 hrs., impregnating the resultant composite plate or sheet with 10.4–42 Wt % tetraethyl orthosilicate in vacuum, subjecting the impregnated composite plate/sheet to heat treatment in absence of air initially at a heating rate in the range of 2°–5° C. per minute upto a temperature in the range of 200°–400° C. followed by further heating at the rate of 10°–15° C. per minute upto a temperature in the range of 1400° C.–1850° C., maintaining the final temperature for a period in the range of 0.5–2 hrs.

In yet another embodiment the natural fibre introduced in the body in desired alignment is selected from unidirectional, multidirectional, woven, and randomly oriented structure.

In yet another embodiment the matrix material used is of different particle dimension ranging from nano to micron size.

In still another embodiment the heat treatment is done in an inert atmosphere or in vacuum.

In an another embodiment the composition is useful for making in situ silicon carbide in the form of particulate, whiskers and fibers in an inorganic matrix selected from silicon carbide-carbon and carbon composite matrix.

SUMMARY OF THIS INVENTION

The process of the present invention can be used to produce in-situ silicon carbide in the form of particulate, whiskers and fibers in an inorganic composite selected from Silicon Carbide-carbon and carbon composite matrix of various shapes and sizes required for application as engineering components. Natural fibers of plant origin contain all the ingredients of forming silicon carbide if sufficient amount of silicon is provided. Organo silicon compounds such as ethyl silicates give active silica on pyrolysis. This active silica inturn reacts with carbon formed from cellulosic materials like fibers of plant origin. Silicon carbide thus formed are in molecular dimension and with proper catalyst and seeding crystals, unidirectional grain growth occurs to form long fibers of small diameters or whiskers of different aspect ratios. Isolated silicon carbide grains may grow in the three dimensions resulting into particulate formation. If these complex set of network structure is allowed to grow in an inorganic composite matrix selected from Silicon Carbide carbon and carbon matrix the resulting microstructure consists of randomly orientated fibers and whiskers in a homogeneous matrix leading to enhanced fracture toughness imparting some machinability in otherwise non-machinable material.

The following examples are given way of illustration of the present invention and should not be construed to limit the scope of the present invention.

EXAMPLE 1

38 gms of phenolic resin of molecular weight 525 is dissolved in 95 ml. Of methanol, 4.2 gms. Of hexamine is added to it and stirred. 9.4 gms. of silicon carbide powder is then blended in this solution. 1.6 gms. Jute fibre is dried at 60° C. for 5 hrs. and is mixed with the above mixture and formed into a composite plate. The composite plate is dried at a temperature of 80° C. for 1 hr. followed by curing at a temperature of 160° C. for 2 hrs. The plate is then impregnated with 46.8 ml. of tetraethyl orthosilicate under vacuum. The vacuum impregnation step is repeated for 5 cycles. The material so obtained is heat treated in argon at the rate of 2° C. per min. upto 400° C. followed by heating in argon at 1400° C. at the rate of 10° C. per min. for 1 hr.

EXAMPLE 2

39 gms. of phenolic resin of molecular weight 475 is dissolved in 97 ml. of toluene. 4.3 gms. of hexamine is added to it and stirred. 9.6 gms. of silicon carbide powder is then blended in this solution. 2 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 45.1 ml. tetraethyl orthosilicate under vacuum. The vacuum impregnation step is repeated for 5 cycles. The material so obtained is heat treated in argon at the rate of 3° C. per min. upto 400° C. followed by heating in argon. at 1500° C. at the rate of 12° C. per min. for 1.5 hrs.

EXAMPLE 3

40 gms. of phenolic resin of molecular weight 550 is dissolved in 100 ml. of methanol. 4.3 gms. of hexamine is added to it and stirred. 9.8 gms. of silicon carbide powder is then blended in this solution. 2.5 ms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 43.4 ml. tetraethyl orthosilicate under vacuum. The vacuum impregnation step is repeated for 5 cycles. The material so obtained is heat treated in argon at the rate of 3° C. per min. upto 400°

EXAMPLE 4

41 gms of phenolic resin of molecular weight 600 is dissolved in 102 ml. of benzene. 4.5 gms. of hexamine is added to it and stirred. 10 gms. of silicon carbide powder is then blended in this solution. 3 gms Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 41.5 ml. tetraethyl orthosilicate under vacuum. The vacuum impregnation step is repeated for 5 cycles. The material so obtained is heat treated in argon at the rate of 3° C. per min. for 1.5 hrs.

EXAMPLE 5

41. gms of phenolic resin of molecular weight 600 is dissolved in 102 ml. of benzene. 4.5 gms. of hexamine is added to it and stirred. 10 gms. of silicon carbide powder is then blended in this solution. 3 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 41.5 ml. tetraethyl orthosilicate under vacuum. The vacuum impregnation step is repeated for 5 cycles. The material so obtained is heat treated in argon at the rate of 3° C. per min. upto 400° C. followed by heating in argon rate 1650° C. at the rate of 13° C. per min. for 1.5 hrs.

EXAMPLE 6

42 gms. of phenolic resin of molecular weight 675 is dissolved in 105 ml. of toluene. 5 gms. of hexamine is added to it and stirred. 11 gms. of silicon carbide powder is then blended in this solution. 3.5 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. Followed by curing at a temperature of 170° C. for 2 hrs. The sheet is then impregnated with 38.5 ml. tetraethyl orthosilicate under vacuum. The vacuum impregnation step is repeated for 5 cycles. The material so obtained is heat treated in argon at the rate of 4° C. per min. upto 400° C. followed by heating in argon at 1700° C. at the rate of 13° C. per min. for 1.5 hrs.

EXAMPLE 7

43 gms. of phenolic resin of molecular weight 650 is dissolved in 107 ml. of methanol. 5 gms. of hexamine is added to it and stirred. 11.5 gms. of silicon carbide powder is then blended in this solution. 4 gms. Jute fibre is dried at 62° C. for 4 hrs. and is mixed with the above mixture and formed into a dough. This dough is then pressed into a composite sheet. This composite sheet. Theet. this composite sheet is dried at a temperature of 75° C. for 2 hrs. followed by curing at a temperature of 170° C. for 2 hrs. The sheet is then impregnated with 36.5 ml. tetraethyl orthosilicate under vacuum. The vacuum impregnation step is repeated for 5 cycles. The material so obtained in heat treated in argon at the rate of 4° C. per min. upto 400° C. followed by heating in argon at 1750° C. at the rate of 14° C. per min. for 1.5 hrs.

EXAMPLE 8

44 gms. of phenolic resin of molecular weight 700 is dissolved in 110 ml. of toluene. 5 gms. of hexamine is added to it and stirred. 12 gms. of silicon carbide powder is then blended in this solution. 4.5 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at temperature of 170° C. for 2 hrs. The sheet is then impregnated with 34. 5 ml. tetraethyl orthosilicate under vacuum. The vacuum impregnation step is repeated for cycles. The material so obtained is heat treated in argon at the rate of 4° C. per min. for 1.5 hrs.

EXAMPLE 9

46 gms. of phenolic resin of molecular weight 450 is dissolved in 115 ml. of benzene. 6.6 gms. of hexamine is added to it and stirred. 12.4 gms. of silicon carbide powder is then blended in this solution. 6.4 gms. Jute fibre is dried at 62° C. for 4 hrs. and is mixed with the above mixture and formed into a dough. This dough is then pressed into a composite plate. This composite plate is dried at a temperature of 75° C. for 2 hrs. followed by curing at a temperature of 170° C. for 2 hrs. The pate is then impregnated with 28.6 ml. tetraethyl orthosilicate under vacuum. The vacuum impregnation step is repeated with 28.6 ml. tetraethyl orthosilicate under vacuum impregnation step is repeated with 28.6 ml. tetraethyl orthosilicate under vacuum. The vacuum impregnation step is repeated for 5 cycles. The material so obtained is heat treated in argon at the rate of 3° per min. upto 400° C. followed by heating in argon at 1850° C. at the rate of 15° C. per min. for 2 hrs.

EXAMPLE 10

42 gms. of phenolic resin of molecular weight 450 is dissolved in 100 ml. of methanol. 6.2 gms. of hexamine is added to it and stirred. 1.6 gms. Jute fibre is dried at 60° C. for 5 hrs. and is mixed with the above mixture and formed into a composite plate. The composite plate is dried at a temperature of 80° C. for 1 hr. followed by curing at a temperature of 160° C. for 2 hrs. The plate is then impregnated with 50.2 ml. of tetraethyl orthosilicate under vacuum. The vacuum impregnation step is repeated for 5 cycles. The material so obtained is heat treated in argon at the rate of 2° C. per min. upto 400° C. followed by heating in argon at 1400° C. at the rate of 10° C. per min. for 1 hr.

EXAMPLE 11

43 gms. of phenolic resin of molecular weight 600 is dissolved in 102 ml. of toluene. 6.3 gms. of hexamine is added to it and stirred. 2 gms. Jute fibre is dried at 62° C. for 4 hrs. and is mixed with the above mixture and formed into a dough. This dough is then pressed into a composite plate. This composite plate is dried at a temperature of 75° C. for 2 hrs. followed by curing at a temperature of 170° C. for 2 hrs. The plate is then impregnated with 48.7 ml. tetraethyl orthosilicate under vacuum. The vacuum impregnation step is repeated for 5 cycles. The material so obtained is heat treated in argon at the rate of 3° C. per min. upto 400° C. followed by heating in argon at 1500° C. at the rate of 12° C. per min. for 1.5 hrs.

EXAMPLE 12

44 gms. of phenolic resin of molecular weight 700 is dissolved in 102 ml. of methanol. 6.3 gms. of hexamine is added to it and stirred. 2.5 gms. Jute fibre is dried at 62° C. for 4 hrs. and is mixed with the above mixture and formed into a dough. This dough is then pressed into a composite plate. This composite plate is dried at a temperature of 75° C. for 2 hrs. followed by curing at a temperature of 170° C. for 2 hrs. The plate is then impregnated with 47.2 ml. tetraethyl orthosilicate under vacuum. The vacuum impregnation step is repeated for 5 cycles. The material so obtained is heat treated in argon at the rate of 3° C. per min. upto 400° C. followed by heating in argon at 1600° C. at the rate of 12° C. per min. for 1.5 hrs.

EXAMPLE 13

46 gms. of phenolic resin of molecular weight 550 is dissolved in 105 ml. of benzene 6.5 gms. of hexamine is added to it and stirred. 3 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 44.5 ml. tetraethyl orthosilicate under vacuum. The vacuum impregnation step is repeated for 5 cycles. The material so obtained is heat treated in argon at the rate of 3° C. per min. upto 400° C. followed by heating in argon at 1650° C. at the rate of 13° C. per min. for 1.5 hrs.

EXAMPLE 14

47 gms. of phenolic resin of molecular weight 650 is dissolved in 105 ml. of toluene. 7 gms. of hexamine is added to it and stirred. 3.5 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 42.5 ml. tetraethyl orthosilicate under vacuum. The vacuum impregnation step is repeated for 5 cycles. The material so obtained is heat treated in argon at the rate of 4° C. per min. upto 400° C. followed by heating in argon at 1700° C. at the rate of 13° C. per min. for 1.5 hrs.

EXAMPLE 15

48 gms. of phenolic resin of molecular weight 475 is dissolved in 108 ml. of methanol. 7 gms. of hexamine is added to it and stirred. 4 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 41 ml tetraethyl orthosilicate under vacuum. The vacuum impregnation step is repeated for 5 cycles. The material so obtained is heat treated in argon at the rate of 4° C. per min. upto 400° C. followed by heating in argon at 1750° C. at the rate of 14° C. per min. for 1.5 hrs.

EXAMPLE 16

49 gms. of phenolic resin of molecular weight 675 is dissolved in 1–10 ml. of toluene. 7 gms. of hexamine is added to it and stirred. 4.5 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 39.5 ml. tetraethyl orthosilicate under vacuum. The vacuum impregnation step is repeated for 5 cycles. The material so obtained is heat treated in argon at the rate of 4° C. per min. upto 400° C. followed by heating in argon at 1800° C. at the rate of 14° C. per min. for 1.5 hrs.

EXAMPLE 17

52 gms. of phenolic resin of molecular weight 525 is dissolved in 115 ml. of benzene. 8.6 gms. of hexamine is added to it and stirred. 6.4 gms. Jute fibre is dried at 62° C. for 4 hrs. and is mixed with the above mixture and formed into a dough. This dough is then pressed into a composite sheet. This composite sheet is dried at a temperature of 75° C. for 2 hrs. followed by curing at a temperature of 170° C. for 2 hrs. The sheet is then impregnated with 33 ml. tetraethyl orthosilicate under vacuum. The vacuum impregnation step is repeated for 5 cycles. The material so obtained is heat treated in argon at the rate of 3° C. per min. upto 400° C. followed by heating in argon at 1850° C. at the rate of 15° C. per min. for 2 hrs.

EXAMPLE 18

3 gms of phenolic resin is mixed with 5 gms of methanol and 1:125 gms of hexamine and stirred. Jute fibre is dried at 60° C for 1 hr. and is impregnated with the above solution and formed into a composite plate. The composite plate is dried at a temperature of 80° C. followed by curing at a temperature of 160° C. for 2 hrs. the plate is then impregnated with ethyl orthosilicate under vacuum. The vacuum impregnation step is repeated for 5 cycles. The material so obtained is heat treated in argon at the rate of 2° C. per minute upto 400° C. followed by heating in argon at 1400° C. at the rate of 10° C. per minute.

EXAMPLE 19

5 gms of phenolic resin is mixed with 7.5 gms of methanol and 1.42 gms of hexamine and stirred. Jute fibre is dried at 65° C. for 1.5 hr. and is impregnated with the above solution and formed into a composite plate. The composite plate is dried at a temperature of 80° C. followed by curing at a temperature of 170° C. for 3 hrs. the plate is then impregnated with eithylorthosilicate under vacuum. The vacuum impregnation step is repeated for 4 cycles. The material so obtained is heat treated in argon at the rate of 3° C. per minute up to 350° C. followed by heating in argon at 1500° C. at the rate of 10° C. per minute.

EXAMPLE 20

9 gms of phenolic resin is mixed with 15 gms of methanol and 3.5 gms of hexamine and stirred. Jute fibre is dried at 90° C. for ½ hr. and is impregnated with the above solution and formed into a composite plate. The composite plate is dried at a Temperature of 80° C. followed by curing at a temperature of 160° C. or 20 hrs. the plate is then impregnated with eithylorthosilicate under vacuum. The vacuum impregnation step is repeated for 5 cycles. The material so obtained is heat treated in argon at the rate of 2° C. per minute up to 400° C. followed by heating in argon at 1750° C. at the rate of 10° C. per minute.

EXAMPLE 21

4.5 gms of phenolic resin is mixed with 7.5 gms of methanol and 1.68 gms of hexamine and stirred. Jute fibre is dried at 60° C. for 1 hr. and is impregnated with the above solution and formed into a composite plate. The composite plate is dried at a temperature of 80° C. followed by curing at a temperature of 160° C. for 20 hrs. the plate is then impregnated with eithylorthosilicate under vacuum. The vacuum impregnation step is repeated for 5 cycles. The material so obtained is heat treated in argon at the rate of 2° C. per minute up to 400° C. followed by heating in argon at 1700° C. at the rate of 10° C. per minute.

The main advantages of the present invention are:
1. Processing steps are reduced to a large extent.
2. Natural fibers of plant origin are used that replaces hazardous synthetic raw materials.
3. The constituents like silicon carbide whiskers and short fibers are formed in situ during the processing of the composite thereby eliminating the need for handling these components which are potential health hazard.
4. Conventional composite fabricating techniques can be used thereby allowing easy formation of material with different microstructure and properties.

We claim:

1. A composition useful for making in-situ silicon carbide in the form of particulate, whiskers and fibers in an inorganic composite matrix selected from silicon carbide carbon and carbon composite matrix,. wherein the said composition comprising:

| | |
|---|---|
| Natural Fibre | 1.6–6.5 Wt % |
| TetraEthyl Orthosilicate | 10.4–42 Wt % |
| Phenolic Resin | 38–73.5 Wt % |
| Curing agent | 4.2–11 Wt % |
| Optionally Silicon Carbide | 9.4–12 Wt % |
| Organic Solvent | requisite amount to dissolve Phenolic resin. |

2. A composition as claimed in claim 1 wherein the inorganic composite matrix further comprises:

| | |
|---|---|
| Natural Fibre | 1.6–6.4 Wt % |
| TetraEthyl Orthosilicate | 10.4–42 Wt % |
| Phenolic Resin | 38–46 Wt % |
| Curing agent | 4.2–6.6 Wt % |
| Silicon Carbide | 9.4–12.4 Wt % |
| Organic Solvent | requisite amount of dissolve Phenolic resin. |

3. A composition as claimed in claim 1 wherein the inorganic composite matrix further comprises:

| | |
|---|---|
| Natural Fibre | 2.5–6.5 Wt % |
| TetraEthyl Orthosilicate | 13.4–40 Wt % |
| Phenolic Resin | 46–73.5 Wt % |
| Curing agent | 7.5–11 Wt % |
| Organic Solvent | requisite amount to dissolve Phenolic resin. |

4. A composition as claimed in claim 1 wherein the fibre is a natural fibre selected from the group consisting of jute, sisal, hem and natural fibre having cellulosic or hemicellulosic constituent at its backbone.

5. A composition as claimed in claim 1 wherein the curing agent is selected from hexamine, para toluenesulphonic acid and para formaldehyde.

6. A composition as claimed in claim 1, wherein the molecular weight of phenolic resin is in the range of 450–700.

7. A composition as claimed in claim 1, wherein the organic solvent is selected from methanol, toluene and benzene.

* * * * *